(12) United States Patent
Naruse et al.

(10) Patent No.: US 6,725,581 B2
(45) Date of Patent: Apr. 27, 2004

(54) CONSTRUCTION EQUIPMENT

(75) Inventors: Masami Naruse, Hirakata (JP);
Naritoshi Ohtsukasa, Hirakata (JP);
Junsei Tanaka, Hirakata (JP); Seiya Haga, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/387,942

(22) Filed: Mar. 13, 2003

(65) Prior Publication Data

US 2003/0221339 A1 Dec. 4, 2003

(30) Foreign Application Priority Data

Jun. 4, 2002 (JP) ........................... 2002-162719

(51) Int. Cl.[7] .............................................. F16D 31/02
(52) U.S. Cl. ............................... 37/348; 60/414; 60/417
(58) Field of Search ........................... 37/348, 382, 443, 37/414; 60/414, 417; 172/3, 2; 414/699, 694

(56) References Cited

U.S. PATENT DOCUMENTS

| | | | | |
|---|---|---|---|---|
| 3,956,891 A | * | 5/1976 | Karazija | 60/413 |
| 4,702,076 A | * | 10/1987 | Rosman | 60/372 |
| 4,761,954 A | * | 8/1988 | Rosman | 60/414 |
| 5,477,677 A | * | 12/1995 | Krnavek | 60/414 |
| 5,488,787 A | * | 2/1996 | Aoyagi et al. | 37/348 |
| 5,794,442 A | * | 8/1998 | Lisniansky | 60/414 |
| 6,005,360 A | * | 12/1999 | Pace | 318/376 |
| 6,151,894 A | * | 11/2000 | Endo et al. | 60/414 |
| 6,199,307 B1 | * | 3/2001 | Kagoshima et al. | 37/443 |
| 6,370,874 B1 | * | 4/2002 | Rausch et al. | 60/413 |
| 6,378,301 B2 | * | 4/2002 | Endo et al. | 60/414 |
| 6,502,393 B1 | * | 1/2003 | Stephenson et al. | 60/414 |
| 6,584,769 B1 | * | 7/2003 | Bruun | 60/414 |
| 6,666,022 B1 | * | 12/2003 | Yoshimatsu et al. | 60/413 |

FOREIGN PATENT DOCUMENTS

| | | |
|---|---|---|
| JP | 10-299706 | * 11/1998 |
| JP | 11-343642 A | 12/1999 |
| JP | 2000-136806 A | 5/2000 |
| JP | 2002-275945 A | 9/2002 |

* cited by examiner

Primary Examiner—Victor Batson
(74) Attorney, Agent, or Firm—Frishauf, Holtz, Goodman & Chick, P.C.

(57) ABSTRACT

Compact, low-cost construction equipment capable of effectively recovering energy from a plurality of hydraulic actuators is provided. To this end, the construction equipment comprises: a hydraulic recovery circuit for recovering return oil from the hydraulic actuators, the circuit being equipped with a pump motor rotatably driven by the recovered return oil; oil guide passages each of which is for guiding return oil from the meter-out side of its corresponding hydraulic actuator to the hydraulic recovery circuit; switches for switching the respective oil guide passages between their opened and closed states; pressure sensors for detecting the back pressure of each hydraulic pressure actuator; and a dynamo-electric generator for generating electric power from the rotary force of the pump motor.

4 Claims, 3 Drawing Sheets

CONSTRUCTION EQUIPMENT

TECHNICAL FIELD

The present invention relates to construction equipment having a system for recovering the energy of return oil from hydraulic actuators.

BACKGROUND ART

The hydraulic driving type is conventionally dominant in the field of construction equipment. For instance, in one known hydraulic excavator, driving of the work implement, rotation of the upper structure, and traveling of the undercarriage are carried out by hydraulic actuators (hydraulic cylinders and hydraulic motors). Such a hydraulic excavator performs excavating operation and the like by controlling feeding of pressure oil to the hydraulic actuators from the hydraulic pump powered by the engine. Such hydraulic construction equipment has the problem of energy loss.

As an attempt to solve the problem of energy loss, the present applicant has previously proposed a hybrid hydraulic excavator in Japanese Patent Application No. 2001-068656. This hybrid hydraulic excavator is designed such that pressure oil discharged from a variable displacement hydraulic pump driven by the engine is fed to hydraulic actuators (a boom cylinder, arm cylinder, bucket cylinder etc.) through a control valve, such that there are provided a dynamo-electric motor driven by the engine and having the function of electric power generation and a battery for storing electric power generated by the dynamo-electric motor and the excessive energy of the engine is accumulated in the battery, and such that running torque is applied to the hydraulic pump by the dynamo-electric motor as required. In this hybrid hydraulic excavator, there is provided a dynamo-electric generator coupled to a hydraulic motor which is rotated by oil returning from the bottom side of the boom cylinder. When the boom is lowered, potential energy is converted to electric energy to be stored in the battery. An electric motor for rotating operation is connected to the upper structure through a decelerator. The rotating movement of the upper structure is performed by driving the rotation electric motor and during the time the rotation of the upper structure is braked, the rotation electric motor is allowed to serve as a dynamo-electric generator and the inertial energy (rotational kinetic energy) of the upper structure is converted into electric energy to be stored in the battery.

Another example of excavators capable of solving the problem of energy loss is the battery-driven excavator disclosed in Japanese Patent Publication Kokai Gazette No. 11-343642. This buttery-driven excavator is designed such that the rotating movement of the upper structure and the rising movement of the boom are carried out by direct driving by a rotation electric motor and a boom operating electric motor which are respectively activated by power from the battery, and such that the arm and the bucket which are positioned away from the gravity point of the machine are actuated by an arm cylinder and a bucket cylinder respectively, these cylinders serving as hydraulic actuators. In this battery-driven excavator, when laying the boom down, the boom operating electric motor is activated as a dynamo-electric generator and the potential energy of the boom is converted into electric energy to be stored in the battery. When braking the rotation of the upper structure, the rotation motor is allowed to function as a dynamo-electric generator and the inertial energy (rotational kinetic energy) of the upper structure is converted into electric energy to be stored in the buttery. Thus, continuous operating time can be effectively increased for energy saving, while using the battery as a driving source.

The hybrid hydraulic excavator and battery-driven excavator, which have been described above, present such a drawback that the energy of return oil produced in the arm cylinder and the bucket cylinder cannot be recovered. In the case of the hybrid hydraulic excavator, although it is conceivable to enable energy recovery by letting the return oils from the arm cylinder and the bucket cylinder flow in the hydraulic motor in which the return oil from the boom cylinder is flowing, there is the possibility of a failure in efficient recovery of the energy of the return oils due to the influence of back flows which may occur owing to the difference between the pressures of the return oils from the respective cylinders.

In addition, since the output torque per unit weight of electric motors is generally small compared to hydraulic actuators, it is necessary to increase the capacity of the rotation electric motor in the case of the hybrid hydraulic excavator and to increase the capacities of the rotation electric motor and the boom operating electric motor in the case of the battery-driven excavator. This causes a problem in terms of configuration and cost performance. Additionally, in the case of power failure, it is difficult to assure safety.

The present invention is directed to overcoming the foregoing problems and a primary object of the invention is therefore to provide compact, inexpensive construction equipment capable of effectively recovering energy from a plurality of hydraulic actuators.

DISCLOSURE OF THE INVENTION

In a first aspect of the invention, the above object can be accomplished by construction equipment having a plurality of hydraulic actuators, the construction equipment further comprising:

a hydraulic recovery circuit for recovering return oil from the hydraulic actuators, the circuit being equipped with a rotating machine rotatably driven by the recovered return oil;

oil guide passages each of which is for guiding return oil from the meter-out side of its corresponding hydraulic actuator to the hydraulic recovery circuit;

switching means for switching the respective oil guide passages between their opened and closed states;

pressure detecting means for detecting the back pressure of each hydraulic pressure actuator; and a dynamo-electric generator for generating electric power from the rotary force of the rotating machine.

According to the invention, when recovering return oil from the meter-out side of one of the hydraulic actuators, the corresponding oil guide passage is opened by the switching operation of the switching means so that the return oil is guided to the hydraulic recovery circuit through the guide oil passage. Then, the rotating machine is rotatably driven by the return oil which has been guided to the hydraulic recovery circuit, so that the dynamo-electric generator generates electric power. Thus, the hydraulic energy of the return oil from the hydraulic actuator can be recovered as electric energy. With this arrangement, driving of a work implement etc. and energy recovery can be carried out by a compact and low-cost system without use of a large-capacity electric motor such as used in the prior art. When recovering return oils from the plurality of hydraulic actuators at the same time, the back pressure of a hydraulic actuator which has been found to be the highest by the pressure detecting means is preferentially selected, and the switching means performs its switching operation so as to guide the return oil associated with the selected back pressure to the hydraulic recovery circuit. In this way, the return oil from a hydraulic actuator having the highest energy recovery efficiency is selectively guided to the hydraulic recovery circuit and the hydraulic energy of this return oil is recovered as electric energy. As a result, a drop in the energy recovery rate due to the interference of the return oils from the plurality of hydraulic actuators can be prevented and effective energy recovery can be assured.

In a second aspect of the invention, there is provided construction equipment having a plurality of hydraulic actuators, wherein at least two sets of hydraulic energy recovering means are provided, each hydraulic energy recovering means comprising:

a hydraulic recovery circuit for recovering return oil from the hydraulic actuators, the circuit being equipped with a rotating machine rotatably driven by the recovered return oil;

oil guide passages each of which is for guiding return oil from the meter-out side of its corresponding hydraulic actuator to the hydraulic recovery circuit;

switching means for switching the respective oil guide passages between their opened and closed states;

pressure detecting means for detecting the back pressure of each hydraulic pressure actuator; and a dynamo-electric generator for generating electric power from the rotary force of the rotating machine.

The construction equipment according to the second aspect of the invention has, of course, the same function and effect as the construction equipment having the first aspect of the invention. Moreover, since it has at least two sets of hydraulic energy recovering means and each means is arranged such that the return oil of a hydraulic actuator having the highest energy recovery rate is selectively guided to the hydraulic recovery circuit and the hydraulic energy of the return oil is recovered as electric energy, it can recover a larger amount of energy than the construction equipment having the first aspect of the invention does.

Preferably, in both of the first and second aspects, the switching means has a controller and the controller is designed as follows. During single actuator operation in which one of the plurality of hydraulic actuators is independently activated, the controller controls the switching operation of the switching means such that the return oil from the activated hydraulic actuator is guided to the hydraulic recovery circuit. During complex actuator operation in which the plurality of hydraulic actuators are activated at the same time, the controller controls the switching operation of the switching means such that the back pressures of the hydraulic actuators detected by the pressure detecting means are compared to select the highest one and the return oil associated with the selected back pressure is guided to the hydraulic recovery circuit. This makes it possible to attain the desired effect with a comparatively simple hydraulic circuit configuration.

BEST MODE FOR CARRYING OUT THE INVENTION

Referring now to the accompanying drawings, construction equipment will be described according to a preferred embodiment of the invention. In this embodiment, the invention is applied to a hybrid hydraulic excavator that is a kind of construction equipment.

Figure 1:
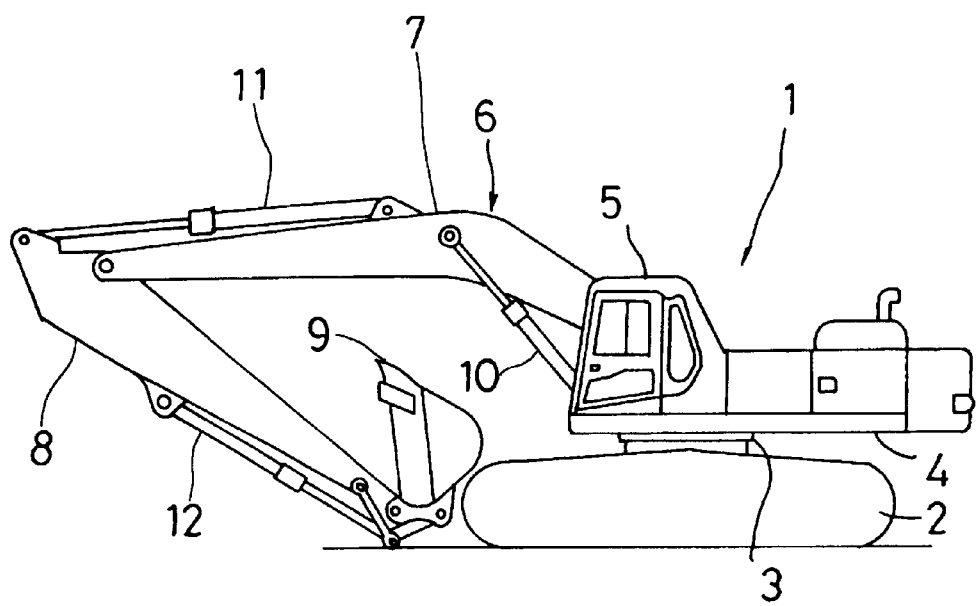
FIG. 1 is a side view of a hybrid hydraulic excavator constructed according to one embodiment of the invention.
Figure 2:
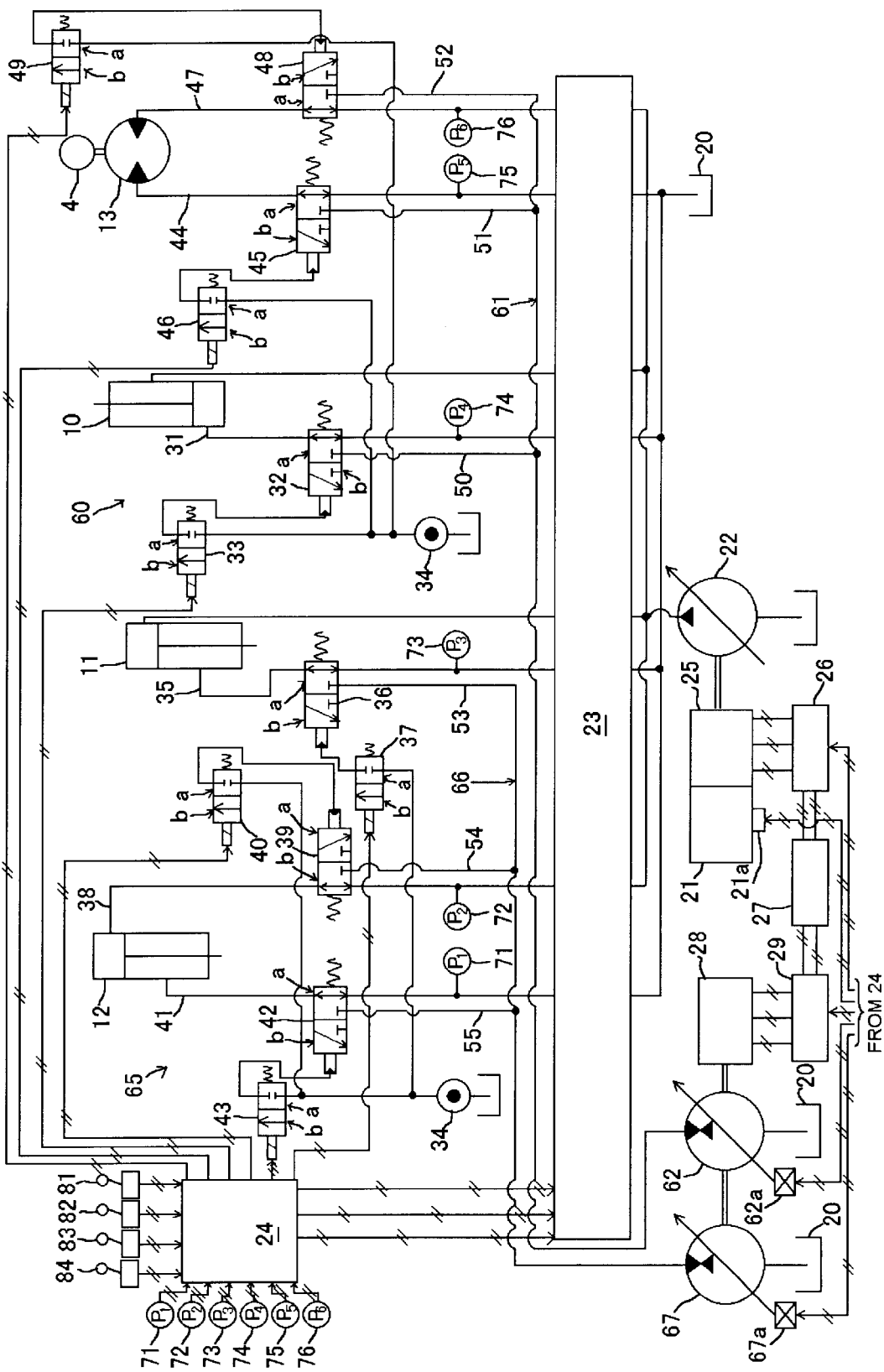
FIG. 2 is a schematic diagram of a hybrid system and an energy recovery system according to the embodiment.

FIG. 1 shows a side view of a hybrid hydraulic excavator according to one embodiment of the invention. FIG. 2 is a schematic diagram of a hybrid system and an energy recovery system according to the embodiment of the invention.

The hybrid hydraulic excavator 1 of the present embodiment comprises, as shown in FIG. 1, an undercarriage 2, an upper structure 4 mounted on the undercarriage 2 through a rotating mechanism 3, and a work implement 6 attached to the upper structure 4. The work implement 6 is composed of a boom 7, an arm 8 and a bucket 9 which are pivotally coupled, being aligned in this order from the side of the upper structure 4. The boom 7, the arm 8 and the bucket 9 are pivotally driven by the expansion and contraction of a boom cylinder 10, an arm cylinder 11 and a bucket cylinder 12, respectively. The upper structure 4 is freely rotatable by driving a hydraulic motor (not shown). The upper structure 4 has a driver's cab 5 in which an operating system (not shown) for the operation of the boom, arm, bucket and others is installed.

As shown in FIG. 2, the hybrid hydraulic excavator 1 comprises an engine 21, a variable displacement hydraulic pump 22, a control valve 23 for controlling the flow of operating oil, and a controller 24 for controlling the operation of the control valve 23 and various instruments described later. In the hybrid hydraulic excavator 1, pressure oil discharged from the hydraulic pump 22 driven by the engine 21 is supplied to the hydraulic actuators, that is, the arm cylinder 11, the bucket cylinder 12 and the hydraulic motor 13 through the control valve 23.

The engine 21 is equipped with a governor 21a for adjusting the revolution speed of the engine 21 according to increases and decreases in load. In operation, a signal which is indicative of a governor instruction on rated engine speed and released from the controller 24 is input to the governor 21a. Thus, the engine 21 is constantly rotated with constant torque at a rated output point.

Mounted on the engine 21 is a dynamo-electric motor 25 which is integral with a flywheel (not shown). The dynamo-electric motor 25 is an induction motor composed of the flywheel serving as a rotor and stators disposed around the flywheel. The dynamo-electric motor 25 also functions as a dynamo-electric generator and is switchable between a motor operation mode for assisting the engine 21 to activate the hydraulic pump and a generator operation mode for producing electric power using the engine 21 as a driving source. The dynamo-electric motor 25 is connected to a battery 27 through an inverter 26 which controls the generator operation and motor operation of the dynamo-electric motor 25 in response to an instruction from the controller 24. As the battery 27, a secondary battery such as the lithium ion battery may be used.

In the present embodiment, the plurality of hydraulic actuators (the boom cylinder 10, arm cylinder 11, bucket cylinder 12, hydraulic motor 13) are classified into two groups, one being the group associated with the hydraulic actuators (the boom cylinder 10, arm cylinder 11) which produce comparatively high back pressure whereas the other is associated with hydraulic actuators (the bucket cylinder 12, hydraulic motor 13) which produces comparatively low back pressure. There are two sets of hydraulic energy recovering means 60, 65, each means being composed of two hydraulic actuators one of which is selected from the above high back pressure group and the other of which is selected from the low back pressure group. The hydraulic energy recovering means 60 has a hydraulic recovery circuit 61 which recovers return oils from the boom cylinder 10 and the hydraulic motor 13 and which is equipped with a pump motor (corresponding to the rotating machine of the invention) 62 rotatably driven by the recovered return oils. The hydraulic energy recovering means 65 has a hydraulic recovery circuit 66 which recovers return oils from the arm cylinder 11 and the bucket cylinder 12 and which is equipped with a pump motor (corresponding to the rotating machine of the invention) 67 rotatably driven by the recovered return oils.

A flow path 31 disposed on the bottom side of the boom cylinder 10 is provided with a guide flow path (oil guide passage) 50 which extends as a branch from the flow path 31 through a selector valve 32. The guide flow path 50 is connected to the hydraulic recovery circuit 61. The selector valve 32 (corresponding to the switching means of the invention) is switched by control pressure oil which has been supplied to the operating section of the selector valve 32 from a control pressure source 34 through an electromagnetic selector valve 33 which has been switched in response to an instruction from the controller 24. For instance, if the selector valve 32 is placed at the position a shown in FIG. 2 (which corresponds to the condition in which the guide flow path 50 is closed), the return oil from the bottom chamber of the boom cylinder 10 flows back to a tank 20 through the flow path 31 and the control valve 23. If the electromagnetic selector valve 33 is switched from the position a to the position b upon receipt of a specified operation signal which has been released in response to an instruction from the controller 24, the control pressure oil from the control pressure source 34 is fed to the operating section of the selector valve 32 so that the selector valve 32 is switched from the position a to the position b (which corresponds to the condition in which the guide flow path 50 is opened). This allows the return oil from the bottom chamber of the boom cylinder 10 to be guided to the hydraulic recovery circuit 61 through the guide flow path 50.

A flow path 44 connected to one input/output port of the hydraulic motor 13 and a flow path 47 connected to the other input/output port are provided with guide flow paths (guide passages) 51, 52 respectively, the guide flow paths 51, 52 extending as a branch from the flow paths 44 and 47 through selector valves 45, 48 respectively. These guide flow paths 51, 52 are respectively connected to the hydraulic recovery circuit 61. The selector valves 45, 48 (corresponding to the switching means of the invention) are switched by control pressure oil which has been supplied to the operating sections of the selector valves 45, 48 from the control pressure source 34 through an electromagnetic selector valves 46, 49 which have been switched in response to an instruction from the controller 24. For instance, if the selector valves 45, 48 are placed at the position a shown in FIG. 2 (which corresponds to the condition in which the guide flow paths 51, 52 are closed), the return oil from either one of the input/output ports of the hydraulic motor 13 flows back to the tank 20 through the flow path 44 and the control valve 23, and the return oil from the other input/output port of the hydraulic motor 13 flows back to the tank 20 through the flow path 47 and the control valve 23. If the electromagnetic selector valve 46 is switched from the position a to the position b upon receipt of a specified operation signal which has been released in response to an instruction from the controller 24, the control pressure oil from the control pressure source 34 is fed to the operating section of the selector valve 45 so that the selector valve 45 is switched from the position a to the position b (which corresponds to the condition in which the guide flow path 51 is opened). This allows the return oil from either one of the input/output ports of the hydraulic motor 13 to be guided to the hydraulic recovery circuit 61 through the guide flow path 51. Similarly, if the electromagnetic selector valve 49 is switched from the position a to the position b, the selector valve 48 is switched from the position a to the position b (which corresponds to the condition in which the guide flow path 47 is opened), the return oil from the other input/output port of the hydraulic motor 13 is guided to the hydraulic recovery circuit 61 through the guide flow path 52.

A flow path 35 disposed on the head side of the arm cylinder 11 is provided with a guide flow path (guide oil passage) 53 which extends as a branch from the flow path 35 through the selector valve 36. The guide flow path 53 is connected to the hydraulic recovery circuit 66. The selector valve 36 (corresponding to the switching means of the invention) is switched by control pressure oil which has been supplied to the operating section of the selector valve 36 from the control pressure source 34 through an electromagnetic selector valve 37 which has been switched in response to an instruction from the controller 24. For instance, if the selector valve 36 is placed at the position a shown in FIG. 2 (which corresponds to the condition in which the guide flow path 53 is closed), the return oil from the head chamber of the arm cylinder 11 flows back to the tank 20 through the flow path 35 and the control valve 23. If the electromagnetic selector valve 37 is switched from the position a to the position b upon receipt of a specified operation signal which has been released in response to an instruction from the controller 24, the control pressure oil from the control pressure source 34 is fed to the operating section of the selector valve 36 so that the selector valve 36 is switched from the position a to the position b (which corresponds to the condition in which the guide flow path 53 is opened). This allows the return oil from the head chamber of the arm cylinder 11 to be guided to the hydraulic recovery circuit 66 through the guide flow path 53.

A flow path 38 disposed on the bottom side of the bucket cylinder 12 and a flow path 41 disposed on the head side of the same are provided with guide flow paths (oil guide passages) 54 and 55 respectively which extend as a branch from the flow paths 38 and 41 through selector valves 39 and 42, respectively. These guide flow paths 54, 55 are respectively connected to the hydraulic recovery circuit 66. The selector valves 39, 42 (corresponding to the switching means of the invention) are switched by control pressure oils which have been supplied to the operating sections of the selector valves 39, 42 from the control pressure source 34 through electromagnetic selector valves 40, 43 which have been switched in response to an instruction from the controller 24. For instance, if the selector valves 39 and 42 are placed at the position a shown in FIG. 2 (which corresponds to the condition in which the guide flow paths 54, 55 are closed), the return oil from the bottom chamber of the bucket cylinder 12 flows back to the tank 20 through the flow path 38 and the control valve 23, and the return oil from the other chamber of the hydraulic motor 13 flows back to the tank 20 through the flow path 41 and the control valve 23. If the electromagnetic selector valve 40 is shifted from the position a to the position b upon receipt of a specified operation signal which has been released in response to an instruction from the controller 24, the control pressure oil from the control pressure source 34 is fed to the operating section of the selector valve 39 so that the selector valve 39 is shifted from the position a to the position b (which corresponds to the condition in which the guide flow path 54 is opened). This allows the return oil from the bottom cylinder of the bucket cylinder 12 to be guided to the hydraulic recovery circuit 66 through the guide flow path 54. Similarly, if the electromagnetic selector valve 43 is shifted from the position a to the position b, the selector valve 42 is shifted from the position a to the position b (which corresponds to the condition in which the guide flow path 54 is opened) and the return oil from the head chamber is guided to the hydraulic recovery circuit 66 through the guide flow path 55.

When the return oil guided to the hydraulic recovery circuit 61 flows back to the tank 20, the pump motor 62 is rotated by the return oil and when the return oil guided to the hydraulic recovery circuit 66 flows back to the tank 20, the pump motor 67 is rotated by the return oil. The output shafts of the pump motors 62, 67 are directly linked and there is provided a dynamo-electric generator 28 which is driven by the rotary force of the directly linked output shafts. The dynamo-electric generator 28 is connected to the battery 27 through a converter (AC/DC converter) 29. The pump motors 62, 67 are variable displacement pump motors and the inclination-rotation angles of the swash plates of the pump motors 62, 67 are controlled by swash plate driving means 62a, 67a in response to an instruction from the controller 24. In the present embodiment, adjustment of the rotational speeds of the pump motors 62, 67 and synchronization of the rotations of the pump motors 62, 67 are carried out by controlling the swash plate inclination-rotation angles.

In the present embodiment, there is provided a pressure detecting means for detecting the back pressures of the bucket cylinder 12, the arm cylinder 11, the boom cylinder 10 and the hydraulic motor 13. More specifically, pressure sensors 71, 72, 73, 74, 75, 76 are mounted to the flow paths 41, 38, 35, 31, 44, 47, and these pressure sensors 71, 72, 73, 74, 75, 76 detect the pressures of the return oils (back pressures) flowing in the flow paths 41, 38, 35, 31, 44, 47. Pressure detection signals from the pressure sensors 71, 72, 73, 74, 75, 76 are input to the controller 24.

There are provided a boom operation lever 81, an arm operation lever 82, a bucket operation lever 83 and a rotating operation lever 84 in the operating system (not shown) disposed in the driver's cab 5. These levers are respectively provided with an operation amount detector (e.g., potentiometer) and detection signals from the operation amount detectors are input to the controller 24. In accordance with a detection signal which has been input, the controller 24 controls the operation of the control valve 23 to adjust the flow rate of pressure oil supplied to the associated hydraulic actuator.

Although details are not shown in the drawings, detection signals from a revolution speed sensor for detecting the revolution speed of the engine 21, a torque sensor for detecting the output torque of the engine 21, a swash plate angle sensor for detecting the swash plate angle of the hydraulic pump 22, a pressure sensor for detecting the discharge pressure of the hydraulic pump 22 and a swash plate angle sensor for detecting the swash plate angles of the pump motors 62, 67 are input to the controller 24.

If the boom operation lever 81, the arm operation lever 82, the bucket operation lever 83 and the rotating operation lever 84 are placed in their neutral positions, the controller 24 reduces the revolution speed of the engine 21 through the governor 21a while the work-load pressure of a pressure compensator valve (not shown) and the delivery pressure of the hydraulic pump 22 put the swash plate driving means (not shown) for the hydraulic pump 22 in operation, changing the swash plate angle of the hydraulic pump 22 (i.e., pump and valve control) so that the amount of discharge oil of the hydraulic pump 22 is reduced to improve fuel efficiency.

In the hybrid hydraulic excavator 1 of the present embodiment having the above-described structure, if work-load is small and the absorbed torque (the torque of the engine 21 which the hydraulic pump 22 requires in order to drive the hydraulic actuators) of the hydraulic pump 22 is smaller than the output torque of the engine 21, the controller 24 allows the dynamo-electric motor 25 to produce electric power by excessive torque. More concretely, the controller 24 calculates the pump absorbed torque from the discharge pressure and swash plate angle of the hydraulic pump 22 and calculates excessive torque from a comparison between the pump absorbed torque and the rated torque and controls, through the inverter 26, the electric current flowing in the dynamo-electric motor 25 such that the excessive torque works on the dynamo-electric motor 25 as power generation torque. The electric energy generated by the excessive torque is stored in the battery 27. In this way, the output of the engine 21 is partially absorbed by the hydraulic pump 22 and consumed for the activation of the work implement and others. The remaining energy is absorbed by the power-generating dynamo-electric motor 25 and accumulated in the battery 27 as electric energy. If work-load is great and the absorbed torque of the hydraulic pump 22 is greater than the output torque of the engine 21, the controller 24 puts the dynamo-electric motor 25 into operation to generate torque equal to the shortfall, whereby the dynamo-electric motor 25 assists the engine 21 to drive the hydraulic pump 22. Specifically, the controller 24 calculates deficient torque by a comparison between the pump absorbed torque and the rated torque and controls, through the inverter 26, an electric current to be fed from the battery 27 to the dynamo-electric motor 25 such that the dynamo-electric motor 25 outputs torque equal to the calculated deficient torque.

Figure 3:
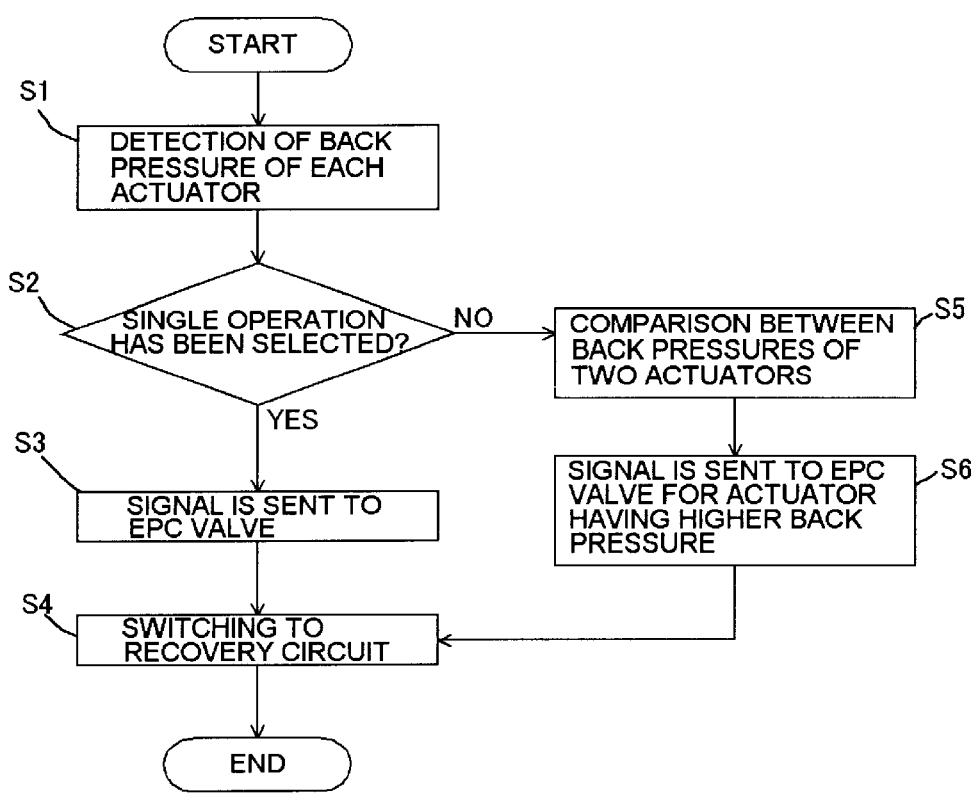
FIG. 3 is a flow chart of the operation of a hydraulic energy recovering means.

Next, reference is made to FIGS. 2 and 3 to describe the operation associated with the recovery of hydraulic energy in the hybrid hydraulic excavator 1 of the present embodiment. In the present embodiment, the hydraulic energy recovering means 60 and 66 are designed to independently recover hydraulic energy. The operation of the hydraulic energy recovering means 60, 66 will be respectively described below.

(A) In The Hydraulic Energy Recovering Means 60

The pressures of the return oils flowing in the flow paths 31, 44, 47 are detected by the pressure sensors 74, 75, 76. In other words, the back pressures of the boom cylinder 10 and the hydraulic motor 13 are detected (Step S1) and a check is made to determine if the single operation or complex operation has been selected (Step S2). Herein, the "single operation" is defined as the operation in which lowering of the boom 7 or the right or left rotation of the upper structure 4 is independently performed, that is, the contraction of the boom cylinder 10 or the normal/reverse rotation of the hydraulic motor 13 is independently carried out. The "complex operation" is defined as the operation in which lowering of the boom 7 and the right or left rotation of the upper structure 4 are simultaneously performed, that is, the contraction of the boom cylinder 11 and the normal/reverse rotation of the hydraulic motor 13 are simultaneously carried out. The determination as to whether the operation which has been selected is the single operation or the complex operation is made according to the presence or absence of detected back pressure or according to input signals from the operation amount detectors for the boom operation lever 81 and the rotating operation lever 84.

If it is determined in Step S2 that the single operation has been selected, the controller 24 sends an operation signal to the associated electromagnetic selector valve (EPC valve) 33, 46 or 49 when recovering the return oil from the meter-out side, so that the guide flow path 50, 51 or 52 associated with the return oil is opened (Step S3).

(1) In The Boom Cylinder 10

The guide flow path 50 is opened for switching to the hydraulic recovery circuit 61 (Step S4) so that the return oil having high pressure and flowing from the bottom side owing to lowering of the boom, that is, contraction of the boom cylinder 10 is guided to the hydraulic recovery circuit 61 through the guide flow path 50 and the pump motor 62 is driven by the return oil. This allows the dynamo-electric generator 28 to be driven to produce electric power which is then converted into d.c. electric power by the converter 29 to be fed to and stored in the battery 27.

(2) In The Hydraulic Motor 13

The guide flow path 51 or 52 is opened for switching to the hydraulic recovery circuit 61 (Step S4) so that the return oil flowing from either of the input/output ports owing to right or left rotation of the upper structure 4, that is, normal or reverse rotation of the hydraulic motor 13 is guided to the hydraulic recovery circuit 61 through the guide flow path 51 or 52 and the pump motor 62 is driven by the return oil. This allows the dynamo-electric generator 28 to be driven to produce electric power which is then stored in the battery 27.

If it is determined in Step S2 that the complex operation has been selected, the back pressure of the boom cylinder 10 is compared with the back pressure of the hydraulic motor 13 (Step S5), and an operation signal is sent from the controller 24 to the associated electromagnetic selector valve (EPC valve) 33, 46 or 49 such that the associated guide flow path 50, 51 or 52 is opened for recovering the return oil from the meter-out side of the hydraulic actuator having higher back pressure (Step S6). This will be more specifically described below.

(1) If the back pressure $P_4$ of the bottom side of the boom cylinder 10 is higher than the back pressure $P_5$ of one input/output port of the hydraulic motor or the back pressure $P_6$ of the other input/output port, the guide flow path 50 is opened for switching to the hydraulic recovery circuit 61 (Step S4), so that the return oil having higher back pressure and flowing from the bottom side of the boom cylinder 10 is guided to the hydraulic recovery circuit 61 through the guide flow path 50 and the pump motor 62 is driven by the return oil. This allows the dynamo-electric generator 28 to be driven to produce electric power which is then converted into d.c. electric power by the converter 29. The d.c. electric power is then supplied to and stored in the battery 27.

(2) If the back pressure $P_4$ of the bottom side of the boom cylinder 10 is lower than the back pressure $P_5$ of one input/output port of the hydraulic motor or the back pressure $P_6$ of the other input/output port, the guide flow path 51 or 52 is opened for switching to the hydraulic recovery circuit 61 (Step S4), so that the return oil having higher back pressure and flowing from either of the input/output ports of the hydraulic motor is guided to the hydraulic recovery circuit 61 through the guide flow path 51 or 52 and the pump motor 62 is driven by the return oil. This allows the dynamo-electric generator 28 to be driven to produce electric power. The electric power is then supplied to and stored in the battery 27.

(B) In The Hydraulic Energy Recovering Means 66

First, the pressure sensors 71, 72, 73 detect the pressures of the return oils flowing in the flow paths 41, 38, 35. In other words, the back pressures of the arm cylinder 11 and the bucket cylinder 12 are detected (Step S1) and a check is made to determine if the single operation or complex operation has been selected (Step S2). Herein, the "single operation" is defined as the operation in which the excavating operation of the arm 8 or the excavating and dumping operation of the bucket 9 is independently performed, that is, the contraction of the arm cylinder 11 or the expansion/contraction of the bucket cylinder 12 is independently carried out. The "complex operation" is defined as the operation in which the excavating operation of the arm 8 and the excavating and dumping operation of the bucket 9 are simultaneously performed, that is, the contraction of the arm cylinder 11 and the expansion/contraction of the bucket cylinder 12 are simultaneously carried out. The determination as to whether the operation which has been selected is the single operation or the complex operation is made according to the presence or absence of detected back pressure or according to input signals from the operation amount detectors for the arm operation lever 82 and the bucket operation lever 83.

Then, if it is determined in Step S2 that the single operation has been selected, the controller 24 sends an operation signal to the associated electromagnetic selector valve (EPC valve) 37, 40 or 43 when recovering the return oil from the meter-out side, so that the guide flow path 53, 54 or 55 associated with the return oil is opened (Step S3).

(1) In The Arm Cylinder 11

The guide flow path 53 is opened for switching to the hydraulic recovery circuit 66 (Step S4) so that the return oil having high pressure and flowing from the head side owing to the excavating operation of the arm, that is, expansion of the arm cylinder 11 is guided to the hydraulic recovery circuit 66 through the guide flow path 53 and the pump motor 67 is driven by the return oil. This allows the dynamo-electric generator 28 to be driven to produce electric power which is then converted into d.c. electric power by the converter 29 to be fed to and stored in the battery 27.

(2) In The Bucket Cylinder 12

The guide flow path 55 or 54 is opened for switching to the hydraulic recovery circuit 66 (Step S4) so that the return oil having high pressure and flowing from the head side or the bottom side owing to the excavating and dumping operation of the bucket 9, that is, expansion/contraction of the bucket cylinder 12 is guided to the hydraulic recovery circuit 66 through the guide flow path 55 or 54 and the pump motor 67 is driven by the return oil. This allows the dynamo-electric generator 28 to be driven to produce electric power. The generated electric power is then fed to and stored in the battery 27.

If it is determined in Step S2 that the complex operation has been selected, the back pressure of the arm cylinder 11 is compared with the back pressure of the bucket cylinder 12 (Step S5), and the controller 24 sends an operation signal to the associated electromagnetic selector valve (EPC valve) 37, 40 or 43 such that the guide flow path 53, 54 or 55 for recovering the return oil from the meter-out side of the hydraulic actuator having higher back pressure is opened (Step S6). This will be more specifically explained.

(1) If the back pressure $P_3$ of the head side of the arm cylinder 11 is higher than the back pressure $P_1$ of the head side of the bucket cylinder 12 or the back pressure $P_2$ of the bottom side of the same, the guide flow path 53 is opened for switching to the hydraulic recovery circuit 66 (Step S4), so that the return oil having higher back pressure and flowing from the head side of the arm cylinder 11 is guided to the hydraulic recovery circuit 66 through the guide flow path 53 and the pump motor 67 is driven by the return oil. This allows the dynamo-electric generator 28 to be driven to produce electric power which is then converted into d.c. electric power by the converter 29. The d.c. electric power is then supplied to and stored in the battery 27.

(2) If the back pressure $P_3$ of the head side of the arm cylinder 11 is lower than the back pressure $P_1$ of the head side of the bucket cylinder 12 or the back pressure $P_2$ of the bottom side of the same, the guide flow path 55 or 54 is opened for switching to the hydraulic recovery circuit 66 (Step S4), so that the return oil having higher back pressure and flowing from the head side or bottom side of the bucket cylinder 12 is guided to the hydraulic recovery circuit 66 through the guide flow path 55 or 54 and the pump motor 67 is driven by the return oil. This allows the dynamo-electric generator 28 to be driven to produce electric power. The generated electric power is then stored in the battery 27.

According to the present embodiment, the operation of the work implement 6 and the upper structure 4 can be effected by the hydraulic actuators such as the boom cylinder 10, the arm cylinder 11, the bucket cylinder 12 and the hydraulic motor 13, similarly to the conventional hydraulic excavators and the hydraulic energy of the return oils from these hydraulic actuators can be recovered as electric energy. Accordingly, driving of the work implement 6 etc. and recovery of energy can be carried out by a compact and low-cost system without use of a large capacity electric motor such as in the prior art and, in addition, security can be assured in the event of power failure. When simultaneously recovering the return oils from the plurality of hydraulic actuators (the arm cylinder 11 and the bucket cylinder 12; or the boom cylinder 10 and the hydraulic motor 13), the higher one of the back pressures of the hydraulic actuators detected by the pressure sensors 71, 72, 73 (74, 75, 76) is preferentially selected. The switching means performs switching operation such that the return oil associated with this selected back pressure is guided to the hydraulic recovery circuit 66 or 61. With this arrangement, the return oil from the hydraulic actuator having the highest energy recovery efficiency is selectively guided to the hydraulic recovery circuit 66 or 61 and the hydraulic energy of this return oil is recovered as electric energy. As a result, a decline in the energy recovery rate due to the interference of the return oils from the plurality of hydraulic actuators (the arm cylinder 11, the bucket cylinder 12; the boom cylinder 10, the hydraulic motor 13) can be prevented and effective energy recovery can be accomplished.

In addition, the plurality of hydraulic actuators (the boom cylinder 10, arm cylinder 11, bucket cylinder 12, hydraulic motor 13) are classified into two groups, one being the group associated with the hydraulic actuators (the boom cylinder 10, arm cylinder 11) which produce comparatively high back pressure whereas the other is associated with hydraulic actuators (the bucket cylinder 12, hydraulic motor 13) which produces comparatively low back pressure. There are two sets of hydraulic energy recovering means 60, 65, each means being composed of two hydraulic actuators one of which is selected from the above high back pressure group and the other of which is selected from the low back pressure group. In each of the hydraulic energy recovery means 60, 65, the return oil from the hydraulic actuator having higher back pressure, that is, the hydraulic actuator having higher energy recovery efficiency is selectively guided to the hydraulic recovery circuit 61 (66) and the hydraulic energy of the return oil is recovered as electric energy, so that a larger amount of hydraulic energy can be recovered on the whole.

The operation associated with the above-described energy recovery is controlled by the switching operation of the selector valve 32, 36, 39, 42, 45 or 48 in conjunction with the switching operation of the associated selector valve 33, 37, 40, 43, 46 or 49 in response to an instruction from the controller 24. The present invention therefore has advantages in that the present energy recovery system can be constructed with a comparatively simple hydraulic circuit configuration.

What is claimed is:

1. Construction equipment having a plurality of hydraulic actuators, the construction equipment further comprising:
    a hydraulic recovery circuit for recovering return oil from the hydraulic actuators, the circuit being equipped with a rotating machine rotatably driven by the recovered return oil;
    oil guide passages each of which is for guiding return oil from the meter-out side of its corresponding hydraulic actuator to the hydraulic recovery circuit;
    switching means for switching the respective oil guide passages between their opened and closed states;
    pressure detecting means for detecting the back pressure of each hydraulic pressure actuator; and
    a dynamo-electric generator for generating electric power from the rotary force of the rotating machine.

2. The construction equipment according to claim 1, wherein said switching means has a controller and said controller controls switching of said switching means such that during single actuator operation in which one of the plurality of hydraulic actuators is independently activated, return oil from the activated hydraulic actuator is guided to the hydraulic recovery circuit and such that during complex actuator operation in which the plurality of hydraulic actuators are simultaneously activated, the back pressures of the hydraulic actuators detected by the pressure detecting means are compared to select the highest back pressure and the return oil associated with the selected back pressure is guided to the hydraulic recovery circuit.

3. Construction equipment having a plurality of hydraulic actuators, wherein at least two sets of hydraulic energy recovering means are provided, each hydraulic energy recovering means comprising:
    a hydraulic recovery circuit for recovering return oil from the hydraulic actuators, the circuit being equipped with a rotating machine rotatably driven by the recovered return oil;
    oil guide passages each of which is for guiding return oil from the meter-out side of its corresponding hydraulic actuator to the hydraulic recovery circuit;
    switching means for switching the respective oil guide passages between their opened and closed states;
    pressure detecting means for detecting the back pressure of each hydraulic pressure actuator; and
    a dynamo-electric generator for generating electric power from the rotary force of the rotating machine.

4. The construction equipment according to claim 3, wherein said switching means has a controller and said controller controls switching of said switching means such that during single actuator operation in which one of the plurality of hydraulic actuators is independently activated, return oil from the activated hydraulic actuator is guided to the hydraulic recovery circuit and such that during complex actuator operation in which the plurality of hydraulic actuators are simultaneously activated, the back pressures of the hydraulic actuators detected by the pressure detecting means are compared to select the highest back pressure and the return oil associated with the selected back pressure is guided to the hydraulic recovery circuit.

* * * * *